(12) United States Patent
Gaddam et al.

(10) Patent No.: US 10,346,822 B2
(45) Date of Patent: Jul. 9, 2019

(54) DYNAMIC ACCOUNT SELECTION

(71) Applicant: Visa International Service Association, San Francisco, CA (US)

(72) Inventors: Ajit Gaddam, Sunnyvale, CA (US); Gyan Prakash, Foster City, CA (US); Selim Aissi, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 521 days.

(21) Appl. No.: 14/466,834

(22) Filed: Aug. 22, 2014

(65) Prior Publication Data

US 2015/0058146 A1 Feb. 26, 2015

Related U.S. Application Data

(60) Provisional application No. 61/869,342, filed on Aug. 23, 2013.

(51) Int. Cl.
| | |
|---|---|
| *G06Q 20/24* | (2012.01) |
| *G06Q 20/22* | (2012.01) |
| *G06Q 20/34* | (2012.01) |
| *G06Q 20/36* | (2012.01) |
| *G06Q 20/32* | (2012.01) |

(52) U.S. Cl.
CPC ......... *G06Q 20/227* (2013.01); *G06Q 20/322* (2013.01); *G06Q 20/341* (2013.01); *G06Q 20/36* (2013.01)

(58) Field of Classification Search
CPC .. G06Q 20/227; G06Q 20/322; G06Q 20/341; G06Q 20/36
See application file for complete search history.

(56) References Cited

U.S. PATENT DOCUMENTS

| | | | | |
|---|---|---|---|---|
| 7,401,731 B1* | 7/2008 | Pletz | ...................... | G06Q 20/24 235/375 |
| 7,413,113 B1* | 8/2008 | Zhu | ........................ | G06Q 20/12 235/375 |
| 7,464,861 B2 | 12/2008 | Gindi | | |
| 7,766,244 B1* | 8/2010 | Field | .................... | G06Q 20/357 235/487 |
| 7,792,717 B1 | 9/2010 | Hankins | | |
| 7,909,246 B2* | 3/2011 | Hogg | ..................... | G06Q 20/04 235/375 |
| 8,123,128 B1 | 2/2012 | Zhu | | |

(Continued)

*Primary Examiner* — Andrew Joseph Rudy
(74) *Attorney, Agent, or Firm* — Kilpatrick Townsend & Stockton LLP

(57) ABSTRACT

Embodiments automatically select one of the multiple pre-generated payment cards provisioned on a mobile device. The multiple pre-generated payment cards (real or virtual) may each have a different credit limit. The mobile device may automatically select one of the multiple payment cards based on a transaction value of a transaction that is being conducted. An available credit limit of the selected payment card may be equal to or slightly greater than the transaction value. In some embodiments, the available credit limit of the selected payment card may be closer to the transaction value than the available credit limits of the remaining payment cards. In some embodiments, the different payment cards may be provisioned in a chip-and-pin based smart credit card or mobile wallet.

13 Claims, 8 Drawing Sheets

(56) References Cited

U.S. PATENT DOCUMENTS

| | | | |
|---|---|---|---|
| 8,249,654 B1* | 8/2012 | Zhu | H04M 17/00 235/375 |
| 8,429,071 B2 | 4/2013 | Davis | |
| 8,615,467 B2 | 12/2013 | Akella | |
| 8,622,308 B1* | 1/2014 | Field | G06Q 20/357 235/379 |
| 8,639,587 B1* | 1/2014 | Whang | G06Q 20/027 705/26.5 |
| 8,768,838 B1* | 7/2014 | Hoffman | G06Q 40/00 705/44 |
| 8,901,904 B2* | 12/2014 | Caldwell | G05F 1/56 323/282 |
| 9,779,398 B2* | 10/2017 | Peterson | G06Q 20/352 |
| 2002/0069122 A1* | 6/2002 | Yun | G06Q 30/06 705/26.1 |
| 2002/0161724 A1* | 10/2002 | Peters | G06Q 20/04 705/72 |
| 2003/0233278 A1* | 12/2003 | Marshall | G06Q 30/00 705/14.35 |
| 2004/0083184 A1* | 4/2004 | Tsuei | G06Q 10/08 705/74 |
| 2005/0097039 A1* | 5/2005 | Kulcsar | G06Q 20/102 705/40 |
| 2005/0273431 A1* | 12/2005 | Abel | G06Q 20/02 705/42 |
| 2006/0064372 A1* | 3/2006 | Gupta | G06Q 20/10 705/39 |
| 2008/0021829 A1* | 1/2008 | Kranzley | G06Q 20/04 705/44 |
| 2008/0078831 A1* | 4/2008 | Johnson | G06Q 20/10 235/380 |
| 2008/0154734 A1* | 6/2008 | Fernandez | G06Q 20/10 705/16 |
| 2008/0154757 A1* | 6/2008 | Barros | G06Q 20/20 705/35 |
| 2009/0037326 A1* | 2/2009 | Chitti | G06Q 20/10 705/39 |
| 2009/0112766 A1* | 4/2009 | Hammad | G06Q 20/10 705/44 |
| 2009/0119204 A1* | 5/2009 | Akella | G06Q 20/10 705/39 |
| 2009/0171794 A1* | 7/2009 | Hogan | G06Q 20/04 705/17 |
| 2009/0171805 A1* | 7/2009 | Gould | G06Q 20/40 705/26.1 |
| 2009/0192904 A1* | 7/2009 | Patterson | G06Q 20/20 705/17 |
| 2010/0082487 A1* | 4/2010 | Nelsen | G06Q 20/10 705/44 |
| 2010/0211445 A1* | 8/2010 | Bodington | G06Q 30/02 705/14.17 |
| 2010/0312636 A1* | 12/2010 | Coulter | G06Q 20/10 705/14.38 |
| 2011/0016049 A1* | 1/2011 | Kilfoil | G06Q 20/40 705/44 |
| 2012/0072384 A1* | 3/2012 | Schreiner | G06Q 30/02 706/45 |
| 2012/0084210 A1* | 4/2012 | Farahmand | G06Q 20/3226 705/64 |
| 2012/0116902 A1* | 5/2012 | Cardina | G06Q 20/10 705/17 |
| 2012/0185378 A1* | 7/2012 | Liu | G06Q 20/04 705/39 |
| 2012/0239417 A1* | 9/2012 | Pourfallah | G06Q 50/22 705/2 |
| 2012/0284177 A1* | 11/2012 | Mukherjee | G06Q 30/04 705/40 |
| 2012/0290421 A1* | 11/2012 | Qawami | G06Q 20/20 705/21 |
| 2012/0310760 A1* | 12/2012 | Phillips | G06Q 40/02 705/26.1 |
| 2013/0046600 A1* | 2/2013 | Coppinger | G06Q 30/0236 705/14.23 |
| 2013/0080328 A1* | 3/2013 | Royyuru | G06Q 30/00 705/44 |
| 2013/0226720 A1* | 8/2013 | Ahluwalia | G06Q 20/20 705/18 |
| 2013/0226788 A1* | 8/2013 | Donikian | G06Q 20/3572 705/39 |
| 2014/0012704 A1* | 1/2014 | Mizhen | G06Q 30/06 705/26.41 |
| 2014/0020068 A1* | 1/2014 | Desai | H04L 63/10 726/4 |
| 2014/0040125 A1* | 2/2014 | Kunz | G06Q 20/105 705/41 |
| 2014/0040131 A1* | 2/2014 | Andrews | G06Q 20/105 705/44 |
| 2014/0129358 A1* | 5/2014 | Mathison | G06Q 20/027 705/17 |
| 2014/0222597 A1* | 8/2014 | Nadella | G06Q 20/204 705/21 |
| 2014/0258121 A1* | 9/2014 | Raman | G06Q 20/383 705/44 |
| 2014/0278905 A1* | 9/2014 | DeNardis | G06Q 20/387 705/14.38 |
| 2015/0058146 A1* | 2/2015 | Gaddam | G06Q 20/322 705/21 |

\* cited by examiner

DYNAMIC ACCOUNT SELECTION

CROSS-REFERENCES TO RELATED APPLICATIONS

This application claims benefit under 35 USC § 119(e) to U.S. Provisional Patent Application No. 61/869,342 filed Aug. 23, 2013 and entitled "Dynamic Account Selection", the disclosure of which is incorporated by reference herein in its entirety for all purposes.

BACKGROUND

There are a number of problems with conventional credit card usage. Conventional credit cards can be subjected to fraudulent transactions, and the risk of loss can be fairly significant. For example, if a credit card with a very high credit limit is used to purchase a low value item, then the potential for loss can be fairly substantial. If, for example, a credit card with an available $10,000 credit limit is used to purchase a $2 sandwich at a restaurant. If an employee at the restaurant engages in fraudulent behavior and wants to steal the credit card number associated with the credit card, then $9998 of available credit will be exposed to potential fraudulent use.

One solution to this problem is to allow a user to generate a temporary card with a limited transaction value and/or expiration period. However, there are limitations to this mechanism. First, the user will need to manually generate a new temporary card for each transaction. Second, the user must always be connected to a remote host computer (thus needing a network connection and connection to the bank website/service) to generate the temporary card number. Further, since the temporary card is not a true credit card, it is limited in its use Embodiments of the invention address these and other problems, individually and collectively.

BRIEF SUMMARY

Embodiments of the invention provide a way to provision a mobile device with multiple pre-generated payment cards (real or virtual) with different credit limits. The mobile device may automatically select one of the multiple payment cards based on a transaction value of a transaction that is being conducted. In some embodiments, the different payment cards may be provisioned in a chip-and-pin based smart credit card or mobile wallet.

In embodiments of the invention, a request is made to a point of sale (POS) for a transaction value. Alternatively, the transaction value for the transaction may be obtained otherwise. Based on the transaction value, the credit card with available credit limit close to the transaction value is automatically selected by a processor, and is exposed for use in the transaction. In some embodiments, the credit card may be selected based on the transaction value being a predetermined percentage of the available credit limit. Alternatively, the credit card with the closest limit (i.e. lowest allowable limit that would permit to conduct the transaction) may be automatically selected. The user may also store the credit card in a cloud wallet for online transactions where the credit card with lowest allowable limit may be used.

One embodiment of the invention is directed to a method including receiving, using a processor, information about a transaction, the information including a transaction value. The method may also include automatically selecting, using the processor, a payment account within a plurality of payment accounts associated with a plurality of limits. The available credit limit associated with the selected payment account is close to the transaction value. The method further includes providing, by the processor, payment account data associated with the selected payment account to an access device.

Another embodiment is directed to a mobile device comprising a processor and a computer readable medium coupled to the processor. The computer readable medium comprises code that, when executed on the processor, causes the processor to receive information about a transaction, the information including a transaction value; automatically select a payment account within a plurality of payment accounts associated with a plurality of limits. The available credit limit associated with the selected payment account is close to the transaction value. The code, when executed on the processor, further causes the processor to provide payment account data associated with the selected payment account to an access device.

Yet another embodiment is directed to a method including receiving, at an access device, a request for a transaction value. The method also includes sending, from the access device, a reply to the request, the reply including the transaction value. The method further includes receiving, at the access device, payment account data to be used for the transaction. An available credit limit associated with the payment account is close to the transaction value, the limit being slightly greater than or equal to the transaction value. The method also includes processing the transaction using the payment account data.

These and other embodiments of the invention are described in further detail below.

DETAILED DESCRIPTION

Figure 1:
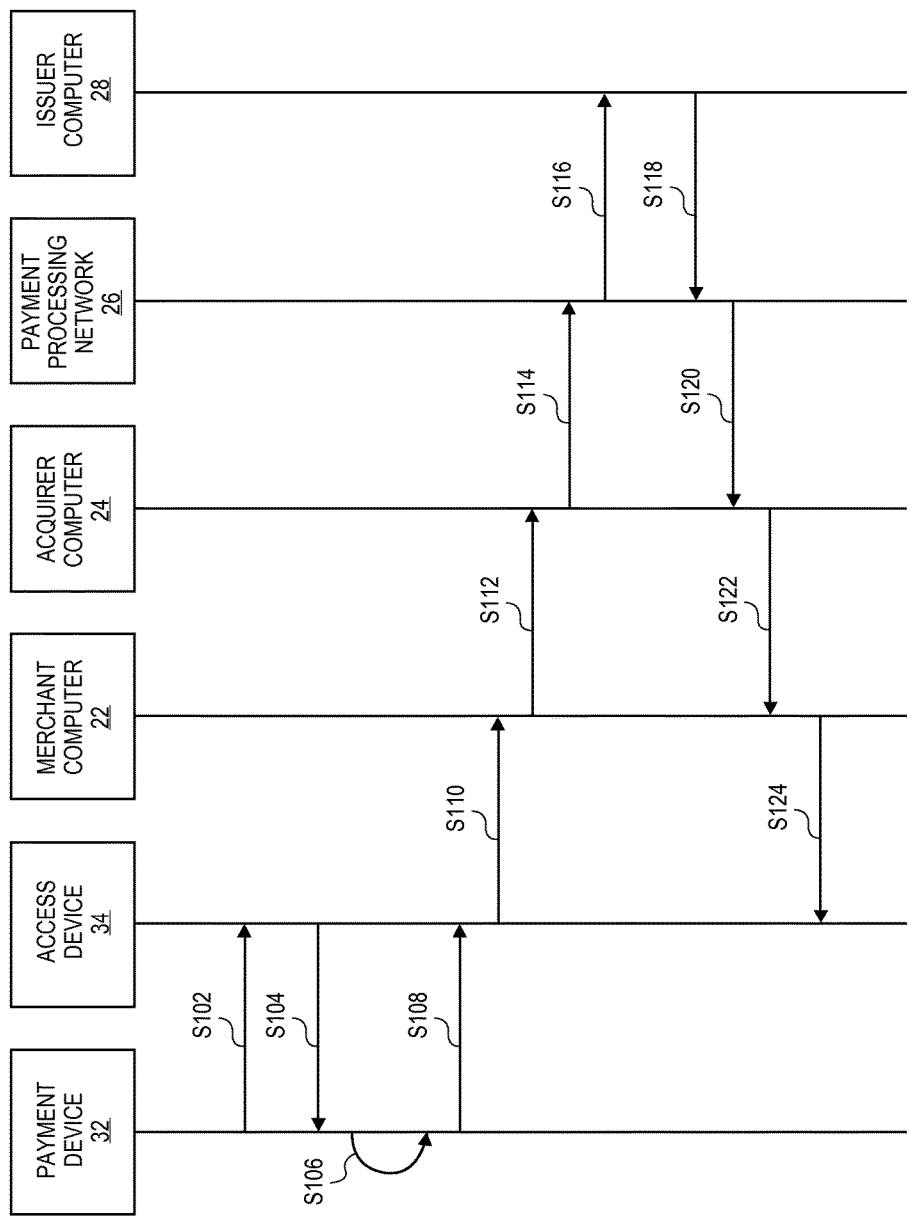
FIG. 1 shows a flowchart illustrating methods according to embodiments of the invention.

Embodiments are directed at systems, methods, and devices for provisioning a mobile device with pre-generated payment cards (real or virtual) and/or payment account numbers with different credit limits. The different payment cards or account numbers can be used for different transactions with different transactional values. One of the payment cards is automatically selected and used (i.e. exposed) based on the value of the transaction being conducted. In other embodiments, the different payment cards or account numbers can be provisioned in a chip-and-pin based smart credit card or mobile wallet.

In embodiments of the invention, a request may be made for a transaction value. For example, the request may be made by a mobile device provisioned with pre-generated payment cards to a point of sale (POS) terminal. Based on the received transaction value, one of the pre-generated payment cards may be automatically selected by, for example, a processor of the mobile device. The available credit limit of the selected card may be close to the transaction value. The available credit limit may be different than the maximum credit limit of the selected card. If previous purchases have been made using the selected card, the available credit limit may be the difference between the assigned credit limit of the selected card minus the total value of the previous transactions. In some embodiments, a ratio of the transaction value to the available credit limit may be a pre-determined value. In other embodiments, the payment card with the lowest allowable credit limit may be selected. The lowest allowable credit limit may be just enough to conduct the transaction without exposing too large of a credit limit during the transaction. For example, the available credit limit of the selected payment card may be slightly more or equal to the transaction value. In some embodiments, the user may store the credit cards in a cloud wallet such as, for example in online transactions, where the lowest allowable credit card is used.

Embodiments of the invention may have a number of other features. For example, the selected payment card can be pre-generated and provisioned in a chip and personal identification number (PIN) card or a mobile wallet. The mobile wallet or the chip and PIN card may query the POS terminal for the value of the transaction. Upon receiving the value of the transaction, the mobile wallet or chip and PIN card may automatically select a payment card or a payment account and forward the payment card information, e.g. the credit card number or the primary account number (PAN) associated with the selected payment card, to the POS terminal. In some embodiments, the user may select a payment card on the mobile wallet to be used for each transaction.

As provided above, some embodiments may use a cloud wallet. The user may upload details of payment cards as provided by the issuer into the cloud wallet. The user may use a wallet application to make an online purchase transaction with minimum risk. A smart agent (e.g. a processor) associated with the mobile device or the cloud wallet may determine the available credit limits associated with the payment accounts and select a payment card/account based on the transaction value such that the available credit limit of the selected payment card/account is close to the transaction value. In some embodiments, the available credit limit of the selected payment card/account may be closer to the transaction value than the available credit limits of the other payment cards/accounts. The available credit limit of the selected payment card/account is always equal to or greater than the transaction value for the transaction to be successfully completed.

Prior to discussing embodiments of the invention, description of some terms may be helpful in understanding embodiments of the invention.

As used herein, an "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction value, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

As used herein, an "electronic wallet" or "digital wallet" can store user profile information, payment information, bank account information, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

As used herein, a "mobile device" may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc.

As used herein, an "online purchase" can be the purchase of a digital or physical item or service via a network, such as the Internet.

As used herein, a "payment account" (which may be associated with one or more payment devices) may refer to any suitable payment account including a credit card account, a checking account, or a prepaid account.

As used herein, a "payment device" may refer to any device that may be used to conduct a financial transaction, such as to provide payment information to a merchant. A payment device may be in any suitable form. For example, suitable payment devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, 2-D barcodes, an electronic or digital wallet, and the like. Such devices can operate in either a contact or contactless mode.

As used herein, a "server computer" may include a powerful computer or cluster of computers. For example, the server computer can be a large mainframe, a minicomputer cluster, or a group of servers functioning as a unit. In one example, the server computer may be a database server coupled to a web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Embodiments of the present invention described herein include multiple different embodiments that may be combined in any suitable manner, as one of ordinary skill in the art would recognize. For example, in the various embodiments described below, various different parties, payment devices, access devices, and transaction processors are described and specific flow diagrams are provided as examples. These examples are provided for illustration of the concepts of the present invention and are meant to be non-limiting. Accordingly, features from the various embodiments may be combined in any suitable manner in different configurations than are provided explicitly in each illustrative system described herein. Accordingly, just one example of the various combinations that could be provided according to some embodiments of the present invention is described in more detail below.

I. Payment Transaction Using a Dynamically Selected Account

Referring now to FIG. 1, a flowchart illustrating methods for automatically selecting and using a payment card based on a transaction value is provided according to various embodiments of the invention. Throughout the description, the terms "payment card" and "payment account" are used interchangeably. Although a credit payment device is described in detail, it is understood that embodiments of the invention may be used for any type of payment cards, including but not limited to stored value cards, debit cards, etc.

A method of using a payment device 32 (e.g., user mobile device, a portable consumer payment device, etc.) at an access device 34 (e.g., POS terminal) can be described as follows.

In step S102, a user may attempt to pay for goods and services provided by a merchant. The merchant may be a mortar-and-brick store or an online store. The user presents his or her payment device 32 to an access device 34 of the merchant to pay for the item or service. Before transmitting a primary account number and other payment data to the access device 34, the payment device 32 may transmit a request to the access device 34 to obtain the transaction value and/or other information about the transaction.

In step S104, the access device 34 provides the transaction value and/or the requested information about the transaction to the payment device 32. The transaction value may be provided by the access device 34 in any suitable manner. For example, the payment device 32 may take a picture of the transaction value or a code (e.g., a barcode) representing the transaction value. Alternatively, the access device 34 may pass the transaction value to the payment device 32 through a contact-based or contactless-based communication medium.

In step S106, a processor in the payment device 32 can automatically select a payment account from a plurality of payment accounts provisioned on the payment device 32. For example, four credit card accounts with available credit limits of $25, $100, $250, and $500, respectively may be provisioned on the payment device 32. The credit card accounts may belong to separate payment accounts or, alternatively, the credit card accounts may be derived from a parent credit card account.

If the received transaction value is $99, then the processor in the payment device 32 may automatically select the credit account associated with the $100 credit limit. By doing so, the payment device 32 selects an account that has sufficient credit to pay for the transaction, but very little credit limit is exposed after the transaction is conducted. In this example, only $1 in credit is left on the $100 credit card account until the user pays his balance on the credit card account. If an unauthorized party steals and tries to use the credit card number with the remaining $1 credit limit, the credit card number will be declined for any purchases over $1. Consequently, the risk to the user and the issuer that issued the credit card account is advantageously reduced.

In step S108, the payment device 32 provides the payment account number (or other payment account identifier) to the access device 34. For example, the payment device 32 may provide (e.g. transmit) the PAN, CVV, expiration date and other data (e.g., cryptograms, etc.) associated with the selected payment account to the access device 34.

The merchant computer 22 may then receive the information including the PAN of the selected credit card account along with the associated CVV, expiration date and other data at step S110 from the access device 34. If the access device 34 has not already generated an authorization request message, the merchant computer 22 may then generate an authorization request message that includes the information received from the access device 34 along with additional transaction information (e.g., a transaction value, merchant specific information, etc.) and at step S112 electronically transmit this information to an acquirer computer 24. At step S114, the acquirer computer 24 may receive and process the authorization request message. At step S116, the acquirer computer 24 may forward the processed authorization request message to the issuer computer 28 via a payment processing network 26 for authorization. The issuer computer 28 generates an authorization response message and forwards the authorization response message to the payment processing network 26 (step S118). At steps S120, S122, and S124, the authorization response message is sent from the payment processing network 26 to the access device 34 via the acquirer computer 24 and the merchant computer 22.

At a later time, after authorization, a clearing and settlement process may be performed between the payment processing network 26, and acquirer operating the acquirer computer 24 and the issuer operating the issuer computer 28.

II. Exemplary Payment Devices

Provided below are descriptions of some devices (and components of those devices) that may be used in the systems and methods described above. These devices may be used, for instance, to receive, transmit, process, and/or store data related to any of the functionality described above. As would be appreciated by one of ordinary skill in the art, the devices described below may have only some of the components described below, or may have additional components.

Figure 2:
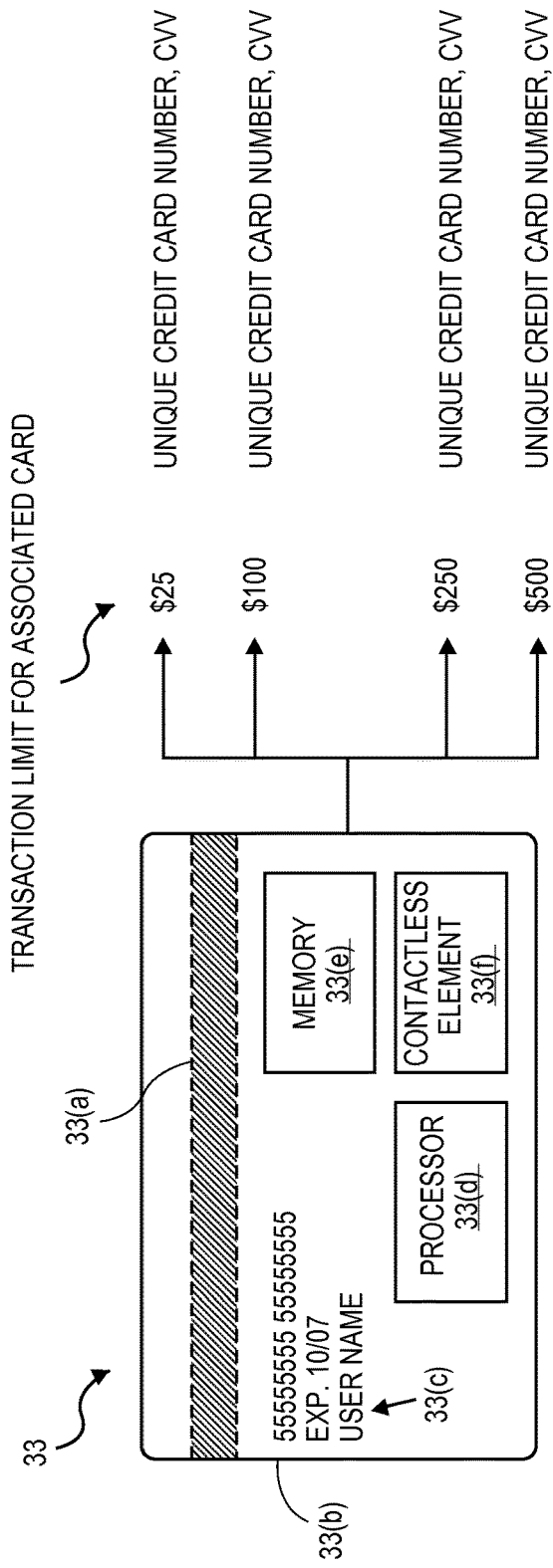
FIG. 2 shows a diagram of a payment card.
Figure 3:
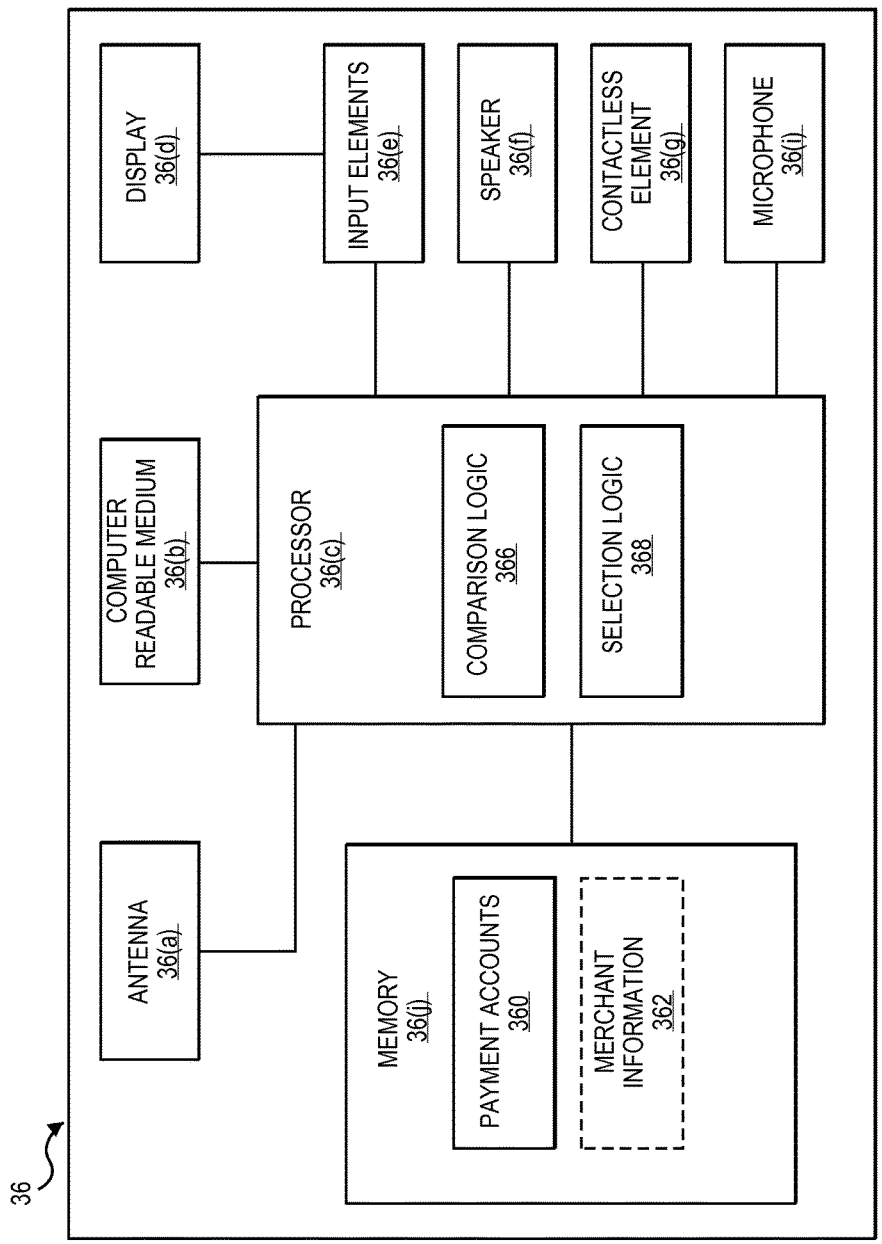
FIG. 3 shows a block diagram of a mobile device according an embodiment of the invention.

According to various embodiments of the present application, the payment device 32 may include a portable consumer payment device such as a payment card. The payment card may include, but is not limited to a smart card, a security card, a credit card or a debit card. An exemplary embodiment of a portable consumer payment device provisioned with multiple payment accounts with different credit limits is illustrated in FIG. 2. In other embodiments, the payment device 32 may include a mobile device. The mobile device may include, but is not limited to, a cellular phone, a smart phone, a tablet or a portable computing device. An exemplary embodiment of a mobile device provisioned with multiple payment accounts with different credit limits is illustrated in FIG. 3.

As provided above, FIG. 2 illustrates the payment device 32 including a portable consumer payment device 33. The portable consumer payment device 33 may include a memory chip 33(e) to store a plurality of separate credit card account numbers. The portable consumer payment device 33 may also include expiration dates and card verification values (CVVs) associated with the four separate credit card account numbers. In the illustrated example, the four credit card account numbers may have credit limits of $25, $100, $250, and $500, respectively. These credit card account numbers may stand alone, or they may be derived from a parent credit card account as shown in FIG. 2. In the illustrated example, the parent credit card account may have a credit limit of $5000, and the $25, $100, $250, and $500 credit limits associated with the four derived credit card numbers may constitute portions of the $5000 credit limit.

FIG. 2 illustrates the portable consumer payment device 33 in the form of a plastic substrate 33(b). In some embodiments, a contactless element 33(f) for interfacing with an access device 34 may be present on, or embedded within, the plastic substrate 33(b). Consumer information 33(c) such as an account number, expiration date, and/or a user name may be printed or embossed on the portable consumer payment device 33. As shown in FIG. 2, the portable consumer payment device 33 may include both a magnetic stripe 33(a) and a contactless element 33(f). In some embodiments, both the magnetic stripe 33(a) and the contactless element 33(f) may be on the portable consumer payment device 33. In some embodiments, either the magnetic stripe 33(a) or the contactless element 33(f) may be present on the portable consumer payment device 33.

The portable consumer payment device 33 may also include a microprocessor 33(d). The microprocessor 33(d) may include logic to select one of the plurality of separate credit card account numbers for a transaction, based on the transaction value. For example, the microprocessor 33(d) may request and subsequently receive the transaction value for a transaction from the access device 34. If the received transaction value is $99, the microprocessor 33(d) may automatically select the credit card account number associated with the $100 available credit limit to be able to pay for the transaction value while exposing minimum residual credit limit. That is, the microprocessor 33(d) may select the credit card account where the limit is closest to and greater than the transaction value.

In some embodiments, the microprocessor 33(d) may automatically select the credit account number having an available credit limit in a pre-determined range of the transaction value. For example, the microprocessor 33(d) may automatically select the credit account number with an available credit limit 5% greater than the transaction value.

In yet other embodiments, the microprocessor 33(d) may automatically select the credit account number based on the transaction value and merchant information. For example, the merchant information may indicate that the merchant is a non-local merchant (e.g. an online merchant or a merchant in a foreign state) or a non-trusted merchant. The microprocessor 33(d) may be programmed to automatically select the credit account number with an available credit limit 0.1% above the transaction value for a non-local or non-trusted merchant. The microprocessor 33(d) may have access to a list of merchants to query whether the merchant is a non-local merchant or a non-trusted merchant. For example a list of merchants may be stored at memory chip 33(e). Alternatively, a list of merchants may be stored at a remote data base or data store accessible by the microprocessor 33(d).

As provided above, in some embodiments, the payment device 32 may include a mobile device such as a cellular phone, a smart phone, a tablet or a portable computing device. FIG. 3 illustrates such an exemplary embodiment.

Referring now to FIG. 3, the payment device 32 may include a mobile device 36 such as a mobile phone. The mobile device 36 may include, but is not limited to, a mobile phone, a tablet, a notification device that can receive alert messages, and/or a multi-purpose general use device that can be used to make payments. The exemplary mobile device 36 may comprise a computer readable medium 36(b) that be present within the body (or outer casing) of the mobile device 36. Alternatively, the computer readable medium 36(b) could be detachable from the device. For example, the computer readable medium 36(b) could comprise an external memory that could be connected through a physical interface such as a USB connection, or the data could be hosted remotely and accessed wirelessly by the device—e.g. the data could be hosted and stored at a remoter server in the "cloud". The computer readable medium 36(b) may be in the form of a memory that stores data.

In addition to the computer readable medium 36(b), the mobile device 36 may include a separate memory 36(j) that may store information such as financial information, transit information (e.g., as in a subway or train pass), access information (e.g., access badges), serial numbers, mobile account information, and any other suitable information. According to various embodiments, the memory 36(j) may store information for a plurality of payment accounts 360.

For example, the payment accounts 360 may include a plurality of credit card accounts associated with a plurality of credit card account numbers. The memory 36(*j*) may store the credit card account numbers along with the associated expiration dates and CVVs. At least two of the stored credit card account numbers may be associated with a different credit limit. In some embodiments, each of the plurality of credit card account numbers may be associated with a different credit limit. In some embodiments, the memory 36(*j*) may store merchant information 362. The merchant information 362 may be used in selecting one of the plurality of credit card account numbers for a transaction, as discussed further below.

The mobile device 36 may include a processor 36(*c*) (e.g., a microprocessor) for performing the functions of the phone 36 and for automatically selecting one of the credit card account numbers stored in the memory 36(*j*). For example, the processor 36(*c*) may include selection logic 368 for automatically selecting one of the credit card account numbers based on a transaction value received from an access device, e.g. a POS terminal. If the received transaction value is $99, the processor 36(*c*) may automatically select the credit card account number associated with the $100 available credit limit to be able to pay for the transaction while exposing minimum residual credit limit. That is, the processor 36(*c*) may select the credit card account where the limit is closest to and greater than the transaction value.

In some embodiments, the processor 36(*c*) may automatically select the credit account number having an available credit limit in a pre-determined range of the transaction value. For example, the processor 36(*c*) may automatically select the credit account number with a credit limit 5% greater than the transaction value.

In yet other embodiments, the processor 36(*c*) may automatically select the credit account number based on the transaction value and merchant information. For example, the merchant information may indicate that the merchant is a non-local merchant (e.g. an online merchant or a merchant in a foreign state) or a non-trusted merchant. The processor 36(*c*) may be programmed to automatically select the credit account number with a credit limit 0.1% above the transaction value for a non-local or non-trusted merchant. The processor 36(*c*) may have access to a list of merchants to query whether the merchant is a non-local merchant or a non-trusted merchant. For example a list of merchants may be stored in memory 36(*j*). Alternatively, a list of merchants may be stored at a remote data base or data store accessible by the processor 36(*c*). The processor 36(*c*) may include comparison logic 366 for comparing the merchant information to the information in the list of merchants.

In general, any of the information stored in the computer readable medium 36(*b*) or the memory 36(*j*) may be transmitted by the mobile device 36 to an access device 34, via any suitable method, including the use of antenna 36(*a*) or contactless element 36(*g*). The contactless element 36(*g*) may be implemented in the form of a semiconductor chip (or other data storage element) with an associated wireless transfer (e.g., data transmission) element, such as an antenna. Contactless element 36(*g*) may be coupled to (e.g., embedded within) the mobile device 36 and data or control instructions that are transmitted via a cellular network may be applied to the contactless element 36(*g*) by means of a contactless element interface (not shown). The contactless element interface functions to permit the exchange of data and/or control instructions between the mobile device circuitry and an optional contactless element 36(*g*), or between another device having a contactless element (e.g. a POS terminal or a payment device). Contactless element 36(*g*) may be capable of transferring and receiving data using a short range wireless communication capability. As noted above, mobile device 36 may comprise components to both be the interrogator device (e.g. receiving data) and the interrogated device (e.g. sending data). Thus, the mobile device 36 may be capable of communicating and transferring data or control instructions via both cellular network (or any other suitable wireless network—e.g. the Internet or other data network) and short range communications.

The mobile device 36 may also include a display 36(*d*) to allow a consumer to see payment account numbers and other information. The mobile device 36 may further include input elements 36(*e*) to allow a user to input information into the device, a speaker 36(*f*) to allow the user to hear voice communication, music, etc., and a microphone 36(*i*) to allow the user to transmit her voice through the mobile device 36.

Figure 4:
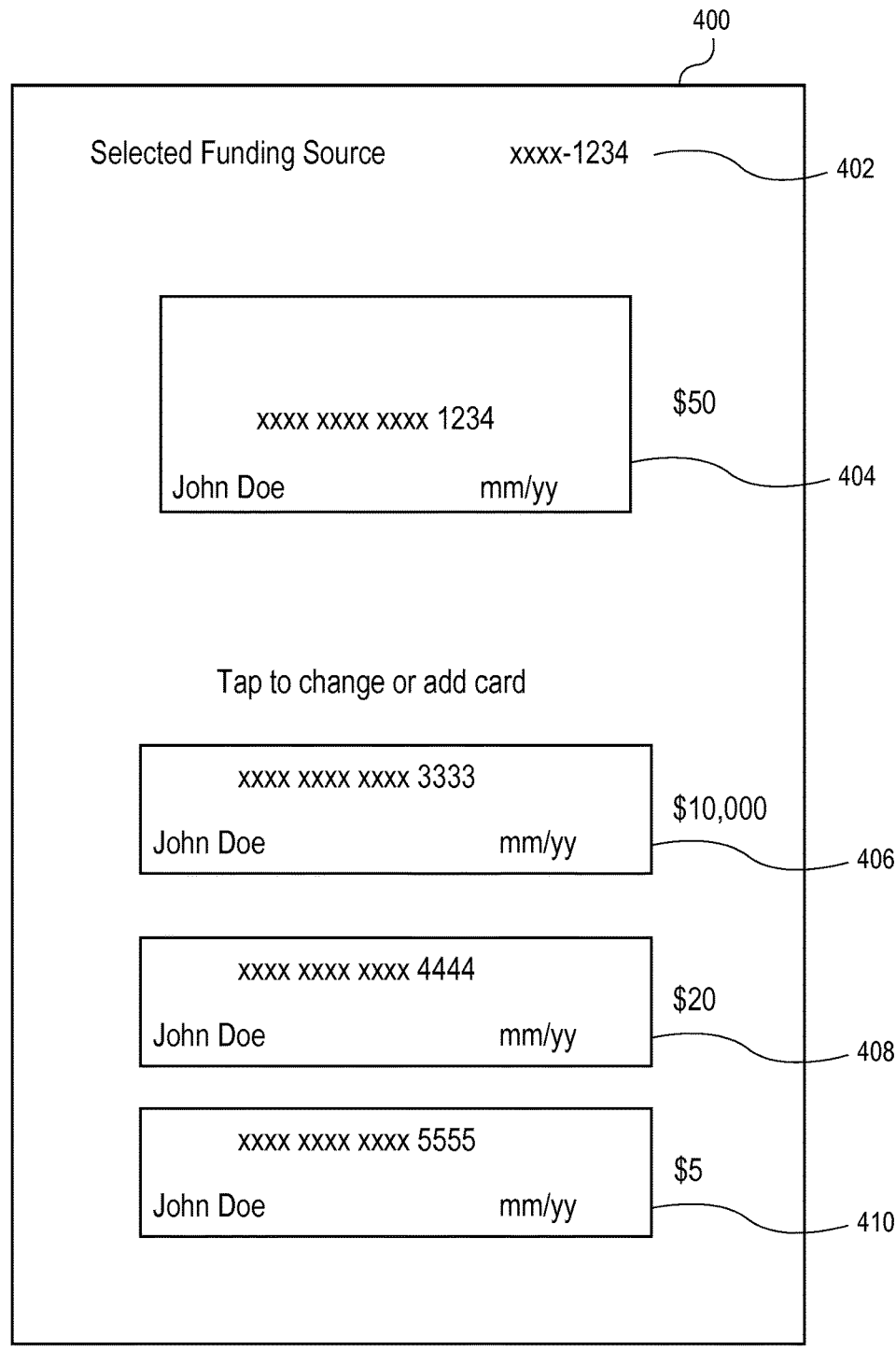
FIG. 4 shows a diagram illustrating different payment cards provided on a mobile device.

As provided above, in some embodiments, the plurality of credit card account numbers may be provided on a mobile wallet. FIG. 4 illustrates an exemplary embodiment of a mobile wallet 400. The mobile wallet 400 may be provided by a mobile wallet application and the user interface for the mobile wallet 400 may be shown in FIG. 4. Specifically, FIG. 4 shows an exemplary embodiment where a plurality of credit cards 404, 406, 408 and 410 are provided on a mobile wallet 400 that is resident on a payment device 32. As discussed above, the payment device 32 may automatically select the most appropriate credit card based on at least the transaction value. For example, in the example illustrated in FIG. 4, if the transaction value is $40, the credit card 404 with an available credit limit of $50 is automatically selected and presented for the transaction being conducted. The mobile wallet 400 may have a dedicated area 402 to display the selected credit card information as the funding source for the transaction being conducted. In some embodiments, the user may have the option to change the selected credit card and select a new credit card to be used for the transaction. The user may not be limited to the credit card accounts displayed on the mobile wallet 400. The user may add other credit cards or remove credit cards from the ones currently included in the mobile wallet 400.

In some embodiments, for a given transaction value, the payment device 32 may automatically select a payment account based on the payment account number. For example, payment processing network operators, such as Visa Inc. and other partners, may assign pre-determined credit limits to the payment cards based on the account numbers. As illustrated in FIG. 4, a payment card ending in 5555 may have a low credit limit (e.g., $5). Another card ending in 3333 may have a higher credit limit (e.g. $10,000). Accordingly, the payment device 32 may use the last digits information (in addition to the transaction value) in determining which credit card account should be selected. In various embodiments, the payment device 32 may also use risk algorithms and routing decisions based on the transaction value and information about the card number.

III. Dynamic Account Selection

Figure 5:
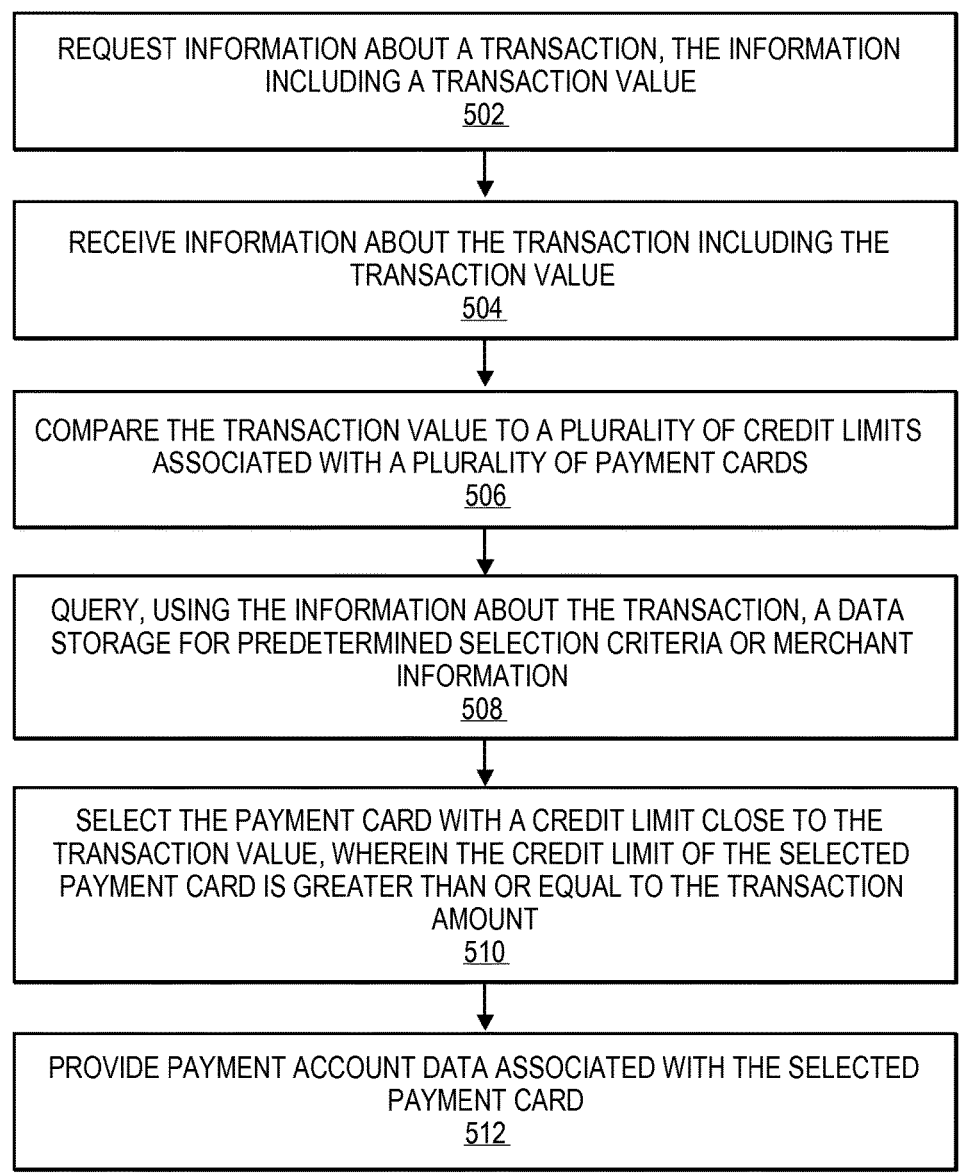
FIG. 5 shows a flowchart of a method for automatically selecting a payment card among a plurality of payment cards based on a transaction value.
Figure 6:
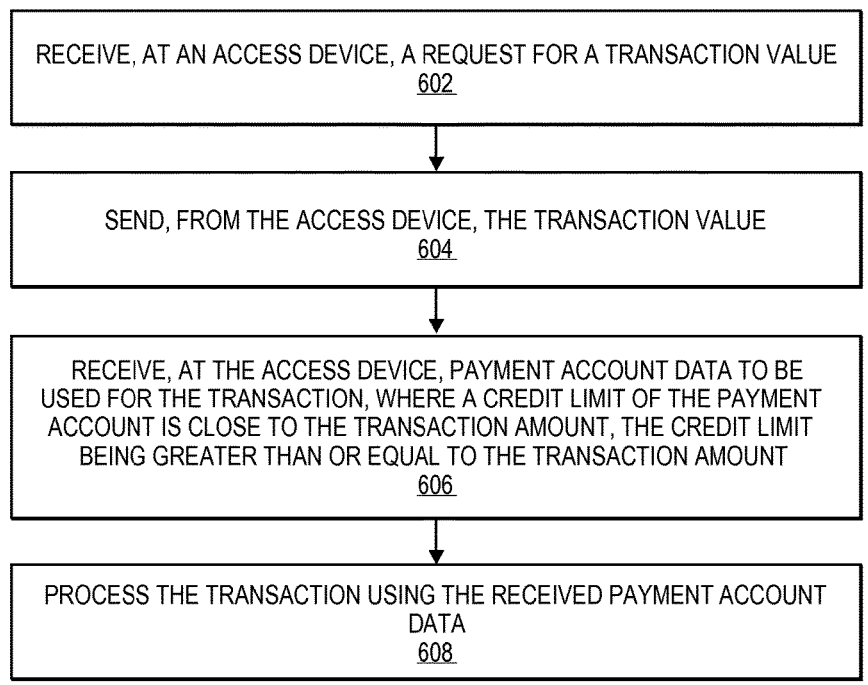
FIG. 6 shows a flowchart of a method for receiving automatically selected payment card for a transaction in response to sending the transaction value to a user device.

According to various embodiments, a mobile device may be provisioned with pre-generated payment cards (real or virtual) or payment account numbers with different credit limits. FIG. 5 illustrates a flowchart 500 of a method for automatically selecting a payment card among a plurality of payment cards based on at least a transaction value. FIG. 6 shows a flowchart 600 of a method for receiving an automatically selected payment card for a transaction in response to sending the transaction value to a user device.

Referring now to FIG. 5, while conducting a payment transaction, a payment device may request information about the transaction (step 502). The requested information may include the transaction value for a good or service that is being purchased (acquired). The requested information may also include merchant information such as the merchant name and location, merchant security rating, etc. The payment device may request the transaction information from an access device such as a POS terminal. At step 504, the payment device may receive the information about the transaction including the transaction value. Alternatively, the payment device may use the received transaction information to determine the transaction value instead of receiving the transaction value directly from the access device. In some embodiments, the transaction value may be provided to the payment device without the payment device requesting the information.

The payment device may store a plurality of payment cards or payment accounts associated with different credit limits. In embodiments of the invention, there may be at least two, three, four, five, or six or more payment accounts or cards available for selection on a payment device. At step 506, the payment device may compare the transaction value to the credit limits of the plurality of payment cards to select one of the plurality of the payment cards to be used for the transaction.

To compare the available credit limits of a plurality of payment cards or payment accounts with the transaction value, the available credit limits of each of the cards or accounts needs to be determined. The available credit limit for a particular card may be different than the maximum (i.e. assigned) credit limit for that card. For example, a cardholder may never have a credit limit over $10,000 (the maximum credit limit) for a particular payment account. By comparison, the actual credit limit may be $5000 of the maximum credit limit $10,000 and $5000 of prior purchases has already been made on the account, but have not yet been paid by the cardholder.

The determination of the available credit limit for each payment account can occur in any suitable manner. In some cases, a mobile wallet application on a phone may have a transaction log for each payment account, and the transaction log may keep track of the available credit limit for each account. The transaction log may be updated periodically when the payment device is online and can communicate with the remote server at the issuer of the account. In other embodiments, the available credit limit may be determined by querying the wallet server or the issuer's computer just prior to or during the transaction being conducted. For example, if the payment device is a mobile phone, then the mobile phone may communicate with a wallet server or issuer computer over the air or through the Internet (e.g., through WiFi) to retrieve the current available credit limits for all accounts associated with the payment device.

In some embodiments, if the payment device received additional information about the transaction, the payment device may query a data store for predetermined selection criteria or merchant information (step 508). For example, if the received transaction information includes information about the merchant, the payment device may query a merchant database to determine whether the merchant is a non-local merchant or a non-trusted merchant. The merchant database may be stored at the payment device or may be stored at a remote location accessible by the payment device. If the payment device determines that the merchant is a non-trusted or a non-local merchant with a low merchant rating, the payment device may select one of the plurality of the payment cards to be used for the transaction based on the merchant rating in addition to the transaction value.

At step 510, the payment device may automatically select a payment card among the plurality of payment cards stored at the payment device based on the transaction value. The selected payment card may have an available credit limit that is close to the transaction value. In some embodiments, the payment device may automatically select the payment card with the closest credit limit to the transaction value. The available credit limit of the payment card is greater than or equal to the transaction value to be able to complete the transaction.

Once the payment card is selected, the payment device may provide payment account data associated with the selected payment card to the merchant to complete the transaction (step 512).

Although the specific examples described above refer to the use of payment account numbers, it is understood that payment tokens may be used in place of payment account numbers. Payment tokens may be encrypted or random values associated with payment account numbers, and they may or may not have the same format as real payment account numbers Referring now to FIG. 6, while conducting a payment transaction, an access device of a merchant may receive a request for a transaction value (step 602). The request may be received from a payment device such as a mobile device of a user. In some embodiments, the request may also include a request for additional information such as merchant location, merchant name, merchant rating (if applicable) and other information about the transaction. At step 604, the access device may provide the transaction value (and other information, if requested) to the requester. Subsequently, at step 606, the access device may receive payment account data to be used in the transaction. The payment account data may have an available credit limit that is close to the transaction value. The available credit limit is greater than or equal to the transaction value in order to be able to complete the transaction. At step 608, the access device may process the transaction (e.g., by generating an authorization request message and transmitting it to an issuer for approval, as described above with respect to FIG. 1).

IV. Additional Exemplary System Embodiments

Provided below is a description of an exemplary system in which embodiments provided herein may be utilized. Although some of the entities and components may be depicted as separate, in some instances, one or more of the components may be combined into a single device or location (and vice versa). Similarly, although certain functionality may be described as being performed by a single entity or component within the system, the functionality may in some instances be performed by multiple components and/or entities (and vice versa). Communication between entities and components may comprise the exchange of data or information using electronic messages and any suitable electronic communication medium and method, as described below.

As used herein, an "issuer" may typically refer to a business entity (e.g., a bank or other financial institution) that maintains financial accounts for the user 702 and often issues a payment device 32 such as a credit card to the user 702. As used herein, a "merchant" may typically refer to an entity that engages in transactions and can sell goods or services to the user 702. As used herein, an "acquirer" may typically refer to a business entity (e.g., a commercial bank or financial institution) that has a business relationship with a particular merchant or similar entity. Some entities can perform both issuer and acquirer functions.

Figure 7:
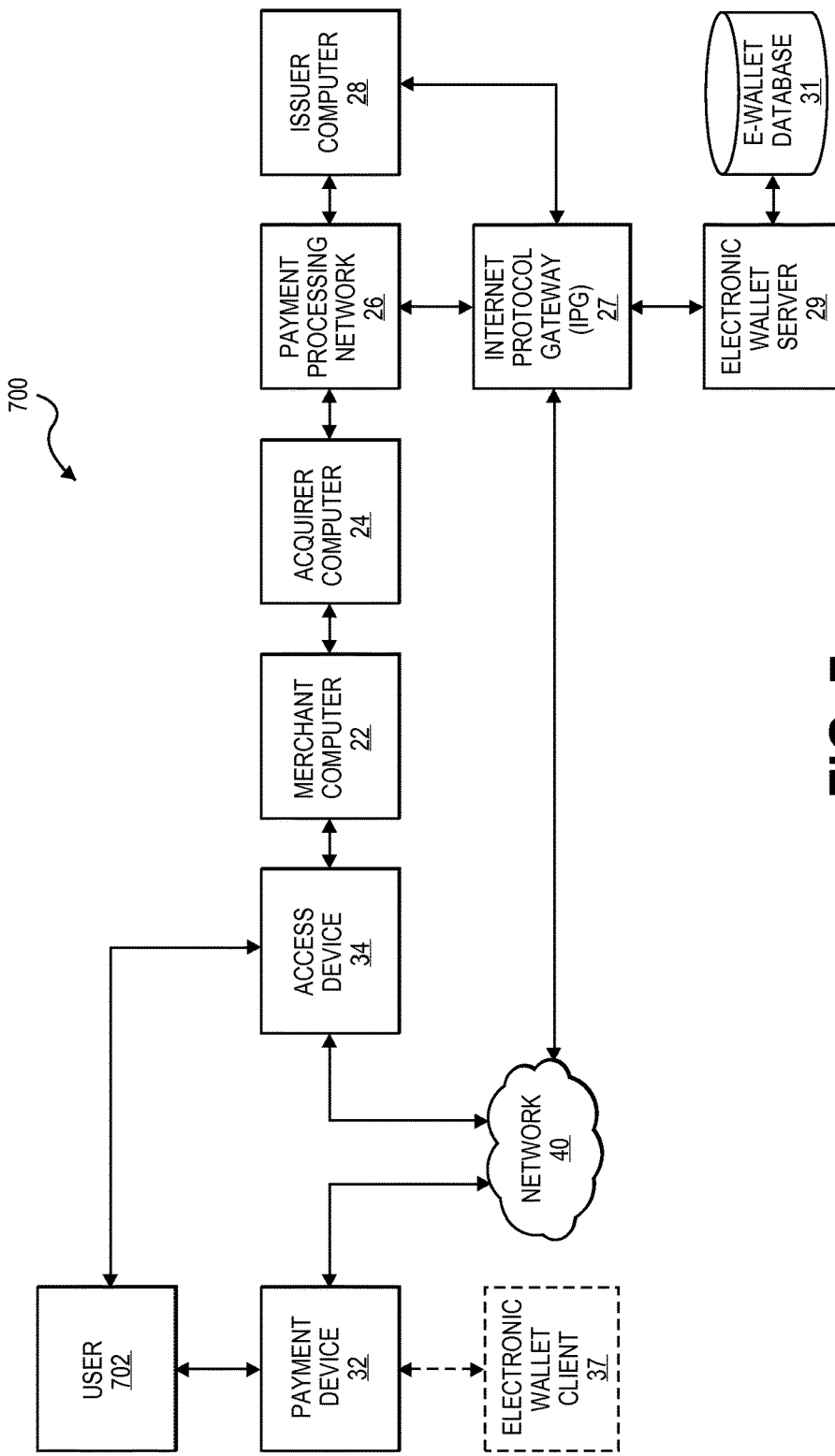
FIG. 7 shows a block diagram of an exemplary financial transaction system.

An exemplary financial transaction system is shown in FIG. 7. The system 700 may include one or more merchants, one or more access devices 34, one or more payment devices 32, one or more acquirers, and one or more issuers. For example, the system 700 may include a merchant having a merchant computer 22 that comprises an external communication interface (e.g., for communicating with an access device 34 and an acquirer 24), system memory comprising one or modules to generate and utilize electronic messages, and a data processor (for facilitating a financial transaction and the exchange of electronic messages); an acquirer having an acquirer computer 24 that comprises an external communication interface (e.g. for communicating with a merchant computer 22 and a payment processing network 26), system memory comprising one or modules to generate and utilize electronic messages, and a data processor (for facilitating a financial transaction and the exchange of electronic messages); and an issuer having an issuer computer 28 that comprises an external communication interface (e.g. for communicating with a payment processing network 26), system memory comprising one or modules to generate and utilize electronic messages, and a data processor (for facilitating a financial transaction and the exchange of electronic messages). The external communication interface of the merchant computer 22 may be coupled to an access device 34 (such that information may be received by the access device 34 and communicated to the merchant computer 22) or, in some embodiments, the access device 34 may comprise a component of the merchant computer 22.

As used in this context, an external communication interface may refer to any hardware and/or software that enables data to be transferred between two or components of system 700 (e.g., between devices residing at locations such as an issuer, acquirer, merchant, payment processing network 26, etc.). Some examples of external communication interfaces may include a modem, a network interface (such as an Ethernet card), a communications port, a Personal Computer Memory Card International Association (PCMCIA) slot and card, or the like. Data transferred via external communications interface may be in the form of signals which may be electrical, electromagnetic, optical, or any other signal capable of being received by the external communications interface (collectively referred to as "electronic signals" or "electronic messages"). These electronic messages that may comprise data or instructions may be provided between one or more of the external communications interface via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable method.

Any suitable communications protocol for storing, representing, and transmitting data between components in the system 700 may be used. Some examples of such methods may include utilizing predefined and static fields (such as in core TCP/IP protocols); "Field: Value" pairs (e.g., HTTP, FTP, SMTP, POP3, and SIP); an XML based format; and/or Tag-Length-Value format.

As shown in the exemplary system 700 in FIG. 7, information from the credit payment device 32 may be provided to the access device 34 either directly (e.g., through a contact or contactless interface) or indirectly through a user computer or mobile device (e.g. in an e-commerce environment or other indirect transaction) via network 40 (such as the Internet). In some embodiments, the user computer or mobile device may interact with the payment processing network 26 (or other entity in the system 700) via the network 40 to form a first communications channel, such as through an Internet Protocol Gateway (IPG) 27. The IPG 27 may be in operative communication with the payment processing network 26. Although the IPG 27 is shown as being a separate entity in FIG. 7, the IPG 27 could be incorporated into the payment processing network 26, or could be omitted from the system 700. In the latter situation, the first communications channel could directly connect the payment processing network 26 and the user computer or mobile device. In general, providing communication from the user 702 to the payment processing network or other entity may enable a variety of increased functionalities to the user 702, such as advanced authentication and verification methods (particularly in e-commerce and similar transactions), examples of which are described in U.S. Ser. No. 12/712,148 filed on Jul. 16, 2010 and U.S. Ser. No. 13/184, 080 filed on Jul. 15, 2011, each of which is incorporated by reference herein in its entirety.

In some embodiments, an electronic or digital wallet (i.e., "e-Wallet") may be utilized as a payment device for conducting a financial transaction. As shown in FIG. 7, such exemplary systems may comprise an electronic wallet server 29, which may be accessible to the user 702 via network 40 (either directly connected or through an IPG 27) and may also be in operational communication with a merchant and/or with a payment processing network 26 (or in some embodiments, the electronic wallet server 29 may comprise a part of the payment processing network 26). The electronic wallet server 29 may be programmed or configured to provide some or all of the functionality associated with conducting transactions using an electronic wallet, including maintaining an association between the user's E-wallet and one or more payment accounts (such as a bank account or credit card account) in the E-Wallet database 31. To provide electronic wallet services (i.e. the use of the electronic wallet associated with a payment account to conduct a financial transaction), the electronic wallet server 29 may further provide a web interface (e.g. through one or more web pages) to receive and transmit requests for payments services and/or may provide an application program interface (API) (shown as electronic wallet client 37) at the payment device 32 to provide the web service. This process is described in more detail in U.S. Application No. 61/466,409 filed on Mar. 22, 2011, which is incorporated herein by reference in its entirety.

As noted above, the user's electronic wallet may be stored in the E-Wallet database 31, which may include information associated with the user's payment accounts, and can be used in conducting a financial transaction with a merchant. For example, the E-Wallet database 31 may include the primary account numbers of one or more payment accounts (e.g., payment accounts associated with a credit card) of the user 702. The E-wallet may be populated with such information during an initial enrollment process in which the user 702 enters information regarding one or more of the payment accounts that may be associated with various issuers. Once the payment account information is added to the E-Wallet database 31, the user 702 may perform transactions by utilizing only his E-wallet. When a user 702 performs a transaction using his electronic wallet, the user 702 need not provide the merchant with payment account information, but may instead provide the electronic wallet information. This information may then be included in an authorization request message, which in turn may be provided to payment processing network 26. The payment processing network 26 may then access the user's E-wallet via a request to the electronic wallet server 29, or may have direct access to the E-wallet database 31 so as to obtain the corresponding payment account information indicated by the information in the authorization request message.

The electronic wallet client 37 may comprise any suitable software that provides front end functionality of the electronic wallet to the user 702. For example, the electronic wallet client 37 may be embodied as a software application downloadable by a computer apparatus or mobile device 32 (e.g., a mobile phone). In some instances, the electronic wallet client 37 may provide a user interface (such as a series of menus or other elements) that allows the user 702 to manage his electronic wallet(s) (i.e. the electronic wallet client 37 may enable interaction with the electronic wallet server 29, and thereby the e-wallet database 31). In some embodiments, the electronic wallet client 37 may store data in a computer readable memory for later use, such as user 702 preferences or identifiers associated with funding sources added to the electronic wallet.

As provided above, in some embodiments, the payment device 32 may query the issuer computer 28 and/or the e-wallet database 31 via network 40 (either directly connected or through the IPG 27) to determine the available credit limit for each payment account. The payment device 32 may retrieve the current available credit limits for one or more accounts associated with the payment device 32 from the issuer computer 28 and/or the e-wallet database 31. The payment device 32 may also provide update about payment transactions to the issuer computer 28 and/or the e-wallet database 31 via network 40. This way, the issuer computer 28 and/or the e-wallet database 31 may update their records and deduct the amount of any additional payment(s) made using a given payment account from the available credit associated with the given payment account.

A payment processing network 26 may be disposed between the acquirer computer 24 and the issuer computer 28 in the system 700. Furthermore, the merchant computer 22, the acquirer computer 24, the payment processing network 26, and the issuer computer 28 may all be in operative communication with each other (i.e., although not depicted in FIG. 7, one or more communication channels may exist between each of the entities, whether or not these channels are used in conducting a financial transaction).

The payment processing network 26 may include data processing subsystems, networks, and operations used to support and deliver authorization services, exception file services, and clearing and settlement services. For example, the payment processing network 26 may comprise a server computer, coupled to a network interface (e.g. by an external communication interface), and a database(s) of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 26 may use any suitable wired or wireless network, including the Internet.

V. Exemplary Computer Apparatuses

Figure 8:
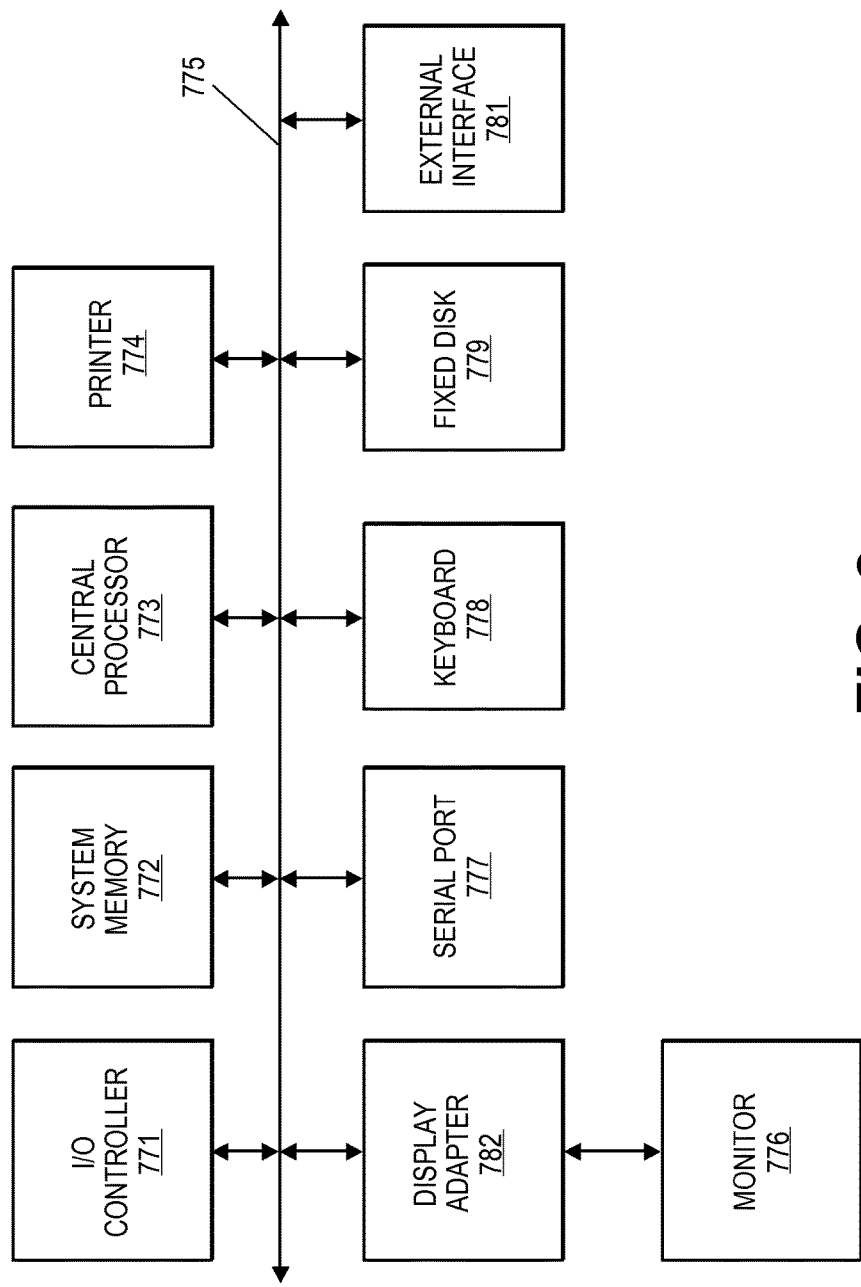
FIG. 8 shows a block diagram of some components of a computer apparatus.

FIG. 8 shows some components in a computer apparatus. The computer apparatus may be used in any of the components illustrated in FIGS. 1, 3 and 7, and such components may use any suitable combination or number of subsystems shown in FIG. 8. The subsystems shown in FIG. 8 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771 (which can be a processor or other suitable controller), can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a," "an," or "the" is intended to mean "one or more" unless specifically indicated to the contrary. Reference to a "first" component does not necessarily require that a second component be provided. Moreover reference to a "first" or a "second" component does not limit the referenced component to a particular location unless expressly stated.

All publications mentioned herein are incorporated herein by reference to disclose and describe the methods and/or materials in connection with which the publications are cited.

What is claimed is:

1. A method comprising:

receiving, using a processor of a payment device, information about a plurality of payment accounts derived from a parent payment account;

storing, at a secure memory element of the payment device, the information about the plurality of payment accounts thereby provisioning the plurality of payment accounts on the payment device;

communicating, using a contactless element of the payment device, with an access device of a merchant to conduct a transaction;

receiving, using the processor of the payment device, information about the transaction from the access device, the information including a transaction value, and also receiving merchant information;

comparing, using the processor of the payment device, the transaction value to a plurality of available limits associated with the plurality of payment accounts, wherein the plurality of available limits constitute portions of an available limit of the parent payment account;

determining, whether the merchant is a trusted or non-trusted merchant based on the received the merchant information;

automatically selecting, using the processor of the payment device, a selected payment account among the plurality of payment accounts based on an available limit associated with the selected payment account being higher than the transaction value by a predetermined amount, wherein the predetermined amount is higher when the merchant is a local or trusted merchant than when the merchant is a non-local or non-trusted merchant; and providing, by the processor of the payment device, payment account data associated with the selected payment account to the access device.

2. The method of claim 1, further comprising:
prior to comparing:
determining, using the processor, the plurality of available limits associated with the plurality of payment accounts, wherein an available limit associated with a payment account is different than an assigned limit to the payment account, wherein a value of the available limit is less than or equal to a value of the assigned limit.

3. The method of claim 1 wherein the available limit is a credit limit and the selected payment account is a credit card account.

4. The method of claim 1 wherein the access device is a POS terminal.

5. The method of claim 1 further comprising:
querying, using the information about the transaction, a data storage for the merchant information, wherein the information about the transaction includes one or more of a merchant name, a merchant address, a merchant identification number, and a merchant rating.

6. The method of claim 5 wherein the merchant is a non-trusted merchant.

7. The method of claim 6 wherein the payment device is a mobile phone.

8. A method comprising:
receiving, using a contactless element of a user device, information about a merchant and a transaction value for a transaction between the merchant and a user of the user device;
determining, using a processor of the user device, a plurality of available limits associated with a plurality of payment accounts, wherein an available limit associated with a payment account is different than an assigned limit to the payment account, wherein a value of the available limit is less than or equal to a value of the assigned limit;
comparing, using a comparison logic executed by the processor, the transaction value to the plurality of available limits associated with the plurality of payment accounts derived from a parent payment account, wherein the plurality of available limits constitute portions of an available limit of the parent payment account;
automatically selecting, using a selection logic executed by the processor, a selected payment account among the plurality of payment accounts based on an available limit associated with the selected payment account being higher than the transaction value by a predetermined amount, wherein the predetermined amount depends on the information about the merchant; and
providing, by the processor, payment account data associated with the selected payment account to an access device of the merchant.

9. The method of claim 8, wherein the predetermined amount has a first value when the information about the merchant indicates that the merchant is a non-local merchant and a second value when the information about the merchant indicates that the merchant is a local merchant, such that the first value is smaller than the second value.

10. A mobile device comprising:
a processor,
a secure memory element,
a contactless element; and
a computer readable medium coupled to the processor, the computer readable medium comprising code that, when executed on the processor, causes the processor to implement a method comprising
receiving, using the processor, information about a plurality of payment accounts derived from a parent payment account;
storing, at the secure memory element, the information about the plurality of payment accounts thereby provisioning the plurality of payment accounts on the mobile device;
communicating, using the contactless element, with an access device of a merchant to conduct a transaction;
receiving, using the processor, information about the transaction, the information including a transaction value from the access device, and receiving merchant information,
comparing, using the processor, the transaction value to a plurality of available limits associated with the plurality of payment accounts, wherein the plurality of available limits constitute portions of an available limit of the parent payment account;
determining, whether the merchant is a trusted or non-trusted merchant based on the received the merchant information;
automatically selecting, using the processor, a selected payment account among the plurality of payment accounts based on an available limit associated with the selected payment account being higher than the transaction value by a predetermined amount,
wherein the predetermined amount is higher when the merchant is a local or trusted merchant than when the merchant is a non-local or non-trusted merchant; and
providing, by the processor, payment account data associated with the selected payment account to the access device.

11. The mobile device of claim 10 wherein the available limit is an available credit limit and the selected payment account is a credit card account.

12. The mobile device of claim 10 wherein the code, when executed on the processor, further causes the processor to:
query, using the information about the transaction, a data storage for the merchant information, wherein the information about the transaction includes one or more of a merchant name, a merchant address, a merchant identification number, and a merchant rating.

13. The mobile device of claim 10 wherein the selected payment account is selected such that the available limit of the selected payment account is within a predetermined range of the transaction value.

* * * * *